Figure 1:
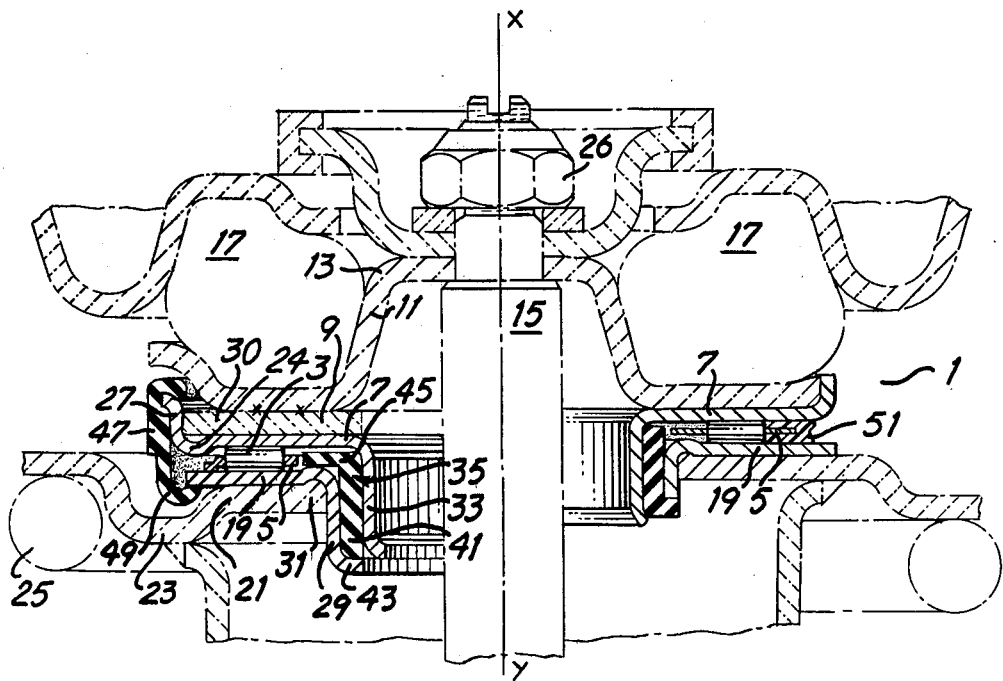

United States Patent [19]

Stephan

[11] 4,325,566
[45] Apr. 20, 1982

[54] COMBINED THRUST AND RADIAL BEARING AND THE ASSEMBLY OF SUCH A BEARING WITH A SUPPORT STRUCTURE

[75] Inventor: Gerard Stephan, Croissy, France

[73] Assignee: Nadella, France

[21] Appl. No.: 148,679

[22] Filed: May 12, 1980

[30] Foreign Application Priority Data

May 25, 1979 [FR] France .............................. 79 13336

[51] Int. Cl.³ ............................................ B60G 11/14
[52] U.S. Cl. .................................... 280/668; 308/35; 308/231
[58] Field of Search ...................... 280/668, 712, 710; 308/35, 37, 231

[56] References Cited

U.S. PATENT DOCUMENTS

| | | | |
|---|---|---|---|
| 3,341,263 | 9/1967 | Pitner | 308/231 |
| 3,836,268 | 9/1974 | Behnke | 308/35 |
| 4,175,770 | 11/1979 | Draisbach | 280/668 |
| 4,200,307 | 4/1980 | Szabo | 280/668 |
| 4,248,454 | 2/1981 | Cotter | 280/668 |

Primary Examiner—Robert R. Song
Attorney, Agent, or Firm—Robert E. Burns; Emmanuel J. Lobato; Bruce L. Adams

[57] ABSTRACT

The combined thrust and radial bearing is combined with a structure which defines two axially extending support surfaces. The bearing comprises two coaxial radially extending bearing plates and a set of rolling elements engaged between the plates. A first of the plates has a first flange extending axially from the inner peripheral edge of the first plate. A second of the plates has a second flange extending axially from the inner peripheral edge of the second plate. The flanges are concentric with each other and a radial bearing is interposed therebetween. The first plate has a third flange extending axially from the outer peripheral edge of the first plate and engaging one of the support surfaces to radially locate the first plate. The second plate is radially located relative to the structure by either the engagement of its second flange or the engagement of a fourth flange with the other of the support surfaces, the fourth flange extending axially from the outer peripheral edge of the second plate.

10 Claims, 2 Drawing Figures

U.S. Patent   Apr. 20, 1982   4,325,566

COMBINED THRUST AND RADIAL BEARING AND THE ASSEMBLY OF SUCH A BEARING WITH A SUPPORT STRUCTURE

This invention relates to a combined thrust and radial bearing and more particularly relates to the radial location of such bearings on a support structure.

Radial location may be achieved by the provision of an axial flange on a bearing plate which flange co-operates with an adjacent surface of a support structure.

In certain applications, and especially for vehicle wheel suspensions, such axial support surfaces do not always exist and their provision requires the addition of unessential supplementary parts, consequently resulting in complication of the suspension assembly and an undesirable increase in weight.

An object of the present invention is to remedy the above-stated drawbacks by the provision of a combined thrust and radial bearing that does not require or only requires a maximum number of special parts having axial support surfaces.

According to the present invention a combined thrust and radial bearing comprises a set of rolling elements disposed between a pair of radial annular bearing plates, each plate having a flange extending axially from the inner peripheral edge thereof, the flanges being concentric and accommodating a radial bearing therebetween, one plate being radially located by means of a further flange extending axially from the outer peripheral edge thereof and the other plate being radially located by means of either the radial bearing flange or a further flange extending axially from the outer peripheral edge thereof.

Figure 2:
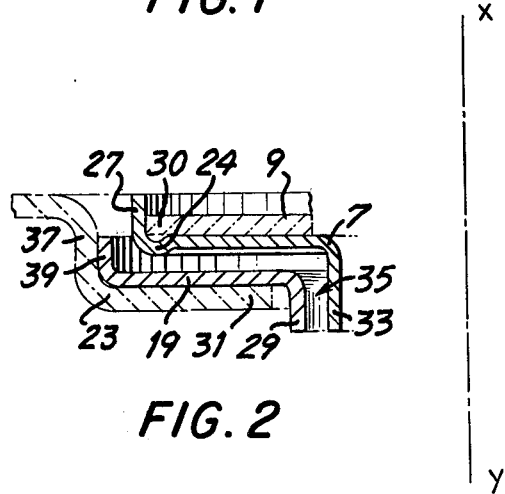

The invention is illustrated, by way of example, in the Drawings, wherein:

FIG. 1 represents two half-sectional views embodiments of a combined thrust and radial bearing in accordance with the invention and mounted in a vehicle wheel suspension; and FIG. 2 is a detail axial half-sectional view of parts of another embodiment of the invention.

The suspension of vehicle wheels using telescopic shock absorbers and concentric coil springs, known as "MacPherson Struts," is a well known concept and only those parts of such systems relevant to the present invention will be described.

FIG. 1 shows a combined axial thrust and radial bearing 1 which consists of a set of rolling elements 3, for example cylindrical rollers, retained in a cage 5, between a first annular radial bearing plate 7 that is supported against a generally sheet metal bell housing 11; the plate being supported either directly as shown by the right hand side of FIG. 1 or indirectly through a ring 9 made fast, for example welded, to the bell housing 11 as shown by the left hand side of FIG. 1. The centre part 13 of the bell housing 11 has an aperture to receive the screwthreaded end portion of a shock absorber piston rod 15 having an axis X-Y. The bell housing 11 is connected to the bodywork of a vehicle through elastomeric blocks 17.

A second annular radial bearing plate 19 is supported by a radial shoulder 21 of the dished end washer 23 for a coil suspension spring 25. A nut 26 is screwed on to the end of the piston rod 15 whereby the bearing 1 is axially locked between the bell housing 11 and the dished washer 23.

The outer peripheral edge 24 of the first bearing plate 7 has an axial flange 27 extending upwardly in the direction Y to X. Plate 7 is centred or radially located by means of the radial abutment of the radial location flange 27 against the outer peripheral edge 30 of ring 9.

The inner peripheral edge of the second bearing plate 19 has an axial flange 29 extending downwardly in the direction X to Y. Plate 19 is centred or radially located by means of the radial abutment of the radial location flange 29 against the inner peripheral edge 31 of the dished washer 23.

The inner peripheral edge of the first bearing plate 7 also has an axial flange 33 extending downwardly concentrically within the radial location flange 29 of plate 19. The two flanges 29 and 33 have a plain radial bearing 35 engaged therebetween.

In the alternative embodiment shown by FIG. 2, the outer peripheral edge of the second bearing plate 19 has an axial flange 39 extending upwardly concentrically outside the radial location flange 27 of plate 7. Plate 19 is centred or radially located by means of the radial abutment of the radial location flange 39 against an axial shoulder 37 of the dished washer 23.

Plate 19 is shown to have an axial flange 29 extending downwardly from its inner peripheral edge and concentrically outside flange 33 of plate 7, again to receive a radial bearing 35 therebetween.

The Drawings and the above description clearly illustrate the centring or radial location of the combined bearing 1 against axial support surfaces 30 and 31 or 30 and 37 without the use of special supplementary support pieces (apart from the optional ring 30) and especially without any direct or indirect contact with the shock absorber piston rod 15.

In order to reduce friction, the plain bearing 35 has a friction ring 41 of synthetic, preferably self-lubricating, material which is axially retained by an inturned radial lip 43 at the lower end of flange 29. The upper end of the friction ring 41 has a radially outwardly extending flange 45 to centre or radially locate the cage 5.

The radial bearing 35 could alternatively be a roller bearing, especially a needle roller bearing.

Two ways of sealing the bearing are illustrated in FIG. 1, the left hand side of the figure illustrates the use of an elastomeric sealing ring 47 mounted on the radial location flange 27 of plate 7 and having a lip 49 bearing sealingly against the underside of plate 19. The right hand side of the figure shows a seal 51 attached to or integral with a cage 5 of synthetic plastics material and having two lips each bearing sealingly against one of the opposed faces of the plates 7, 19.

The bearing plates 7, 19 are preferably sheet metal stampings which enables easy formation of the flanges.

What I claim is:

1. An assembly comprising a structure defining two axially extending support surfaces and a combined thrust and radial bearing which is combined with said structure and comprises two coaxial radially extending annular bearing plates, a set of rolling elements disposed between said bearing plates, a first of said plates having a first flange extending axially from an inner peripheral edge of said first plate and a second of said plates having a second flange extending axially from an inner peripheral edge of said second plate, the flanges being concentric with each other, a radial bearing interposed between said flanges, said first plate having a third flange which extends axially from an outer peripheral edge of said first plate and engages a first of said support surfaces so as to be radially located relative to said structure, and said second plate having axially extending means which engage a second of said support surfaces and radially locates said second plate relative to said structure.

2. An assembly as claimed in claim 1, wherein said axially extending means radially locating said second plate comprise said second flange.

3. An assembly as claimed in claim 2, wherein said third flange of said first plate extends away from the rolling elements in a given direction and said second flange of said second plate extends away from the rolling elements in a direction opposed to said given direction.

4. An assembly as claimed in claim 1, wherein said axially extending means for radially locating said second plate comprise a fourth flange which extends axially from an outer peripheral edge of said second plate.

5. An assembly as claimed in claim 4, wherein said first flange of said first plate extends away from the rolling elements in a given direction, said fourth flange of said second plate extends coaxially with and outside said third flange of said first plate, said second bearing flange of said second plate extends away from the rolling elements in a direction opposed to said given direction, and said first flange of said first plate extends concentrically within said second flange of said second plate.

6. A bearing as claimed in any one of claims 1, 2, 4, 3 or 5, wherein the radial bearing is a plain bearing.

7. A bearing as claimed in claim 6, wherein the radial bearing comprises a friction ring and one of said first and second flanges has a radial lip which is in axially retaining relation to the friction ring.

8. A bearing as claimed in claim 7, wherein the friction ring has a radially extending flange and a cage for the set of rolling elements is in radially located relation to said flange of said friction ring.

9. A bearing as claimed in any one of claims 1, 2, 4, 3 or 5, wherein the radial bearing is a roller bearing.

10. An assembly as claimed in any one of the claims 1, 2, 4, 3 or 5, wherein said structure comprises a telescopic shock-absorber of a vehicle, said shock-absorber comprising a piston rod and a dished washer of a suspension coil spring, one of said support surfaces being defined by means carried by said piston rod and the other of said support surfaces being defined by means carried by said dished washer.

* * * * *